United States Patent
V

(10) Patent No.: US 12,376,136 B2
(45) Date of Patent: Jul. 29, 2025

(54) BANDWIDTH SELECTION IN WI-FI 7 ACCESS POINTS

(71) Applicant: Fortinet, Inc., Sunnyvale, CA (US)

(72) Inventor: Vijayakumar V, Ulsoor (IN)

(73) Assignee: Fortinet, Inc., Sunnyvale, CA (US)

( * ) Notice: Subject to any disclaimer, the term of this patent is extended or adjusted under 35 U.S.C. 154(b) by 246 days.

(21) Appl. No.: 18/203,272

(22) Filed: May 30, 2023

(65) Prior Publication Data

US 2024/0224311 A1 Jul. 4, 2024

Related U.S. Application Data

(63) Continuation-in-part of application No. 18/092,297, filed on Dec. 31, 2022.

(51) Int. Cl.
*H04W 72/52* (2023.01)
*H04L 5/00* (2006.01)
*H04W 84/12* (2009.01)

(52) U.S. Cl.
CPC ........... *H04W 72/52* (2023.01); *H04L 5/0007* (2013.01); *H04L 5/0035* (2013.01); *H04W 84/12* (2013.01)

(58) Field of Classification Search
CPC . H04W 72/52; H04W 84/12; H04W 72/0453; H04L 5/0007; H04L 5/0035
See application file for complete search history.

(56) References Cited

U.S. PATENT DOCUMENTS

| | | |
|---|---|---|
| 2016/0285775 A1 | 9/2016 | Damnjanovic et al. |
| 2020/0014576 A1 | 1/2020 | Cherian et al. |
| 2020/0154483 A1* | 5/2020 | Han ................. H04W 74/002 |
| 2021/0176785 A1* | 6/2021 | Jang ..................... H04L 1/0068 |
| 2021/0204291 A1 | 7/2021 | Anand et al. |

OTHER PUBLICATIONS

Deng et al. "IEEE 802.11be Wi-Fi 7: New Challenges and Opportunities" IEEE Communications Surveys & Tutorials, vol. 22, No. 4, Fourth Quarter 2020 (Year: 2020).

* cited by examiner

*Primary Examiner* — Sun Jong Kim
(74) *Attorney, Agent, or Firm* — Law Office of Dorian Cartwright; Dorian Cartwright

(57) ABSTRACT

A threshold usage of the primary channel transmission bandwidth is detected exceeding a predetermined value, triggering a second mode. Responsive to reaching the threshold usage detection, a puncturing pattern is activated to transmit data frames over the remaining channel transmission bandwidth while continuing to transmit management frames over the primary channel transmission bandwidth. Responsive to reaching the threshold usage detection, data packets are separated using RU allocations for multiple wireless clients over the remaining channel transmission bandwidth. Data packets are then transmitted according to bandwidth limitations and spectral limitations.

8 Claims, 6 Drawing Sheets

| Element ID | Length | Element ID Extension | EHT Operation Information | Disabled Subchannel Bitmap |

| 80 MHz | No puncturing | [1 1 1 1] | |
|---|---|---|---|
| | 20 MHz punctured | [x 1 1 1] 36/20Mhz is punctured | |
| | | [1 x 1 1] | |
| | | [1 1 x 1] | |
| | | [1 1 1 x] | |

FIG. 3

BANDWIDTH SELECTION IN WI-FI 7 ACCESS POINTS

CROSS-REFERENCE TO RELATED APPLICATIONS

The present invention is related as a continuation-in-part under 35 USC 120 (a) to U.S. application Ser. No. 18/092,297, filed Dec. 31, 2022, by Vijakakumar V, and the contents of which are being hereby incorporated by reference in its entirety.

FIELD OF THE INVENTION

The invention relates generally to computer networks, and more specifically, to using dynamic puncturing of data frames to manage Wi-Fi 7 channel transmission bandwidth.

BACKGROUND

In Wi-Fi 7, a standard promulgated for wireless networking by IEEE, an increased number of access points can quickly overburden the system with management frames. In particular, when multiple access points have multiple BSSIDs using the same primary channel for beaconing, probing and association process. When multiple wireless clients send probe requests, multiple access points having multiple BSSID responds with probe response. All these management frames can leads to channel utilization on primary channel. When primary channel is more utilized, it may impact data transmission and reception.

What is needed is a robust technique for using dynamic puncturing of data frames to manage and optimize Wi-Fi 7 channel transmission bandwidth.

SUMMARY

To meet the above-described needs, methods, computer program products, and systems for cache look up during packet processing by uniformly caching non-uniform lengths of payload data that have various lengths of keys to the payload data in a dual-stage cache of a packet processor.

In one embodiment, usage of the primary channel transmission bandwidth within the entire channel transmission bandwidth is monitored. In a first mode, an entire channel transmission bandwidth is occupied for transmissions, including a primary channel transmission bandwidth and a remaining channel transmission bandwidth. Management frames and data frames are sent and received to and from multiple Wi-Fi 7 clients along from a plurality of access point having multiple BSSIDs.

In another embodiment, a threshold usage of the primary channel transmission bandwidth is detected exceeding a predetermined value, triggering a second mode. Responsive to reaching the threshold usage detection, a puncturing pattern is activated to transmit data frames over the remaining channel transmission bandwidth while continuing to transmit management frames over the primary channel transmission bandwidth.

Responsive to reaching the threshold usage detection, data packets are separated using RU allocations for multiple wireless clients over the remaining channel transmission bandwidth. Data packets are then transmitted according to bandwidth limitations and spectral limitations.

Advantageously, computer performance is improved due to improved computer networking.

BRIEF DESCRIPTION OF THE DRAWINGS

In the following drawings, like reference numbers are used to refer to like elements. Although the following figures depict various examples of the invention, the invention is not limited to the examples depicted in the figures.

FIG. 3 is a block diagram illustrating a frame format of EHT (Extremely High Throughput) Operation Element, according to an embodiment.

DETAILED DESCRIPTION

Methods, computer program products, and systems for dynamic data frame puncturing to manage Wi-Fi 7 channel bandwidth. Generally, puncturing is when a transmitting device omits portions of a channel bandwidth. One of ordinary skill in the art will recognize many alternative embodiments that are not explicitly listed based on the following disclosure.

I. Network Systems for Dynamic Data Frame Puncturing (FIGS. 1-3)

Figure 1:
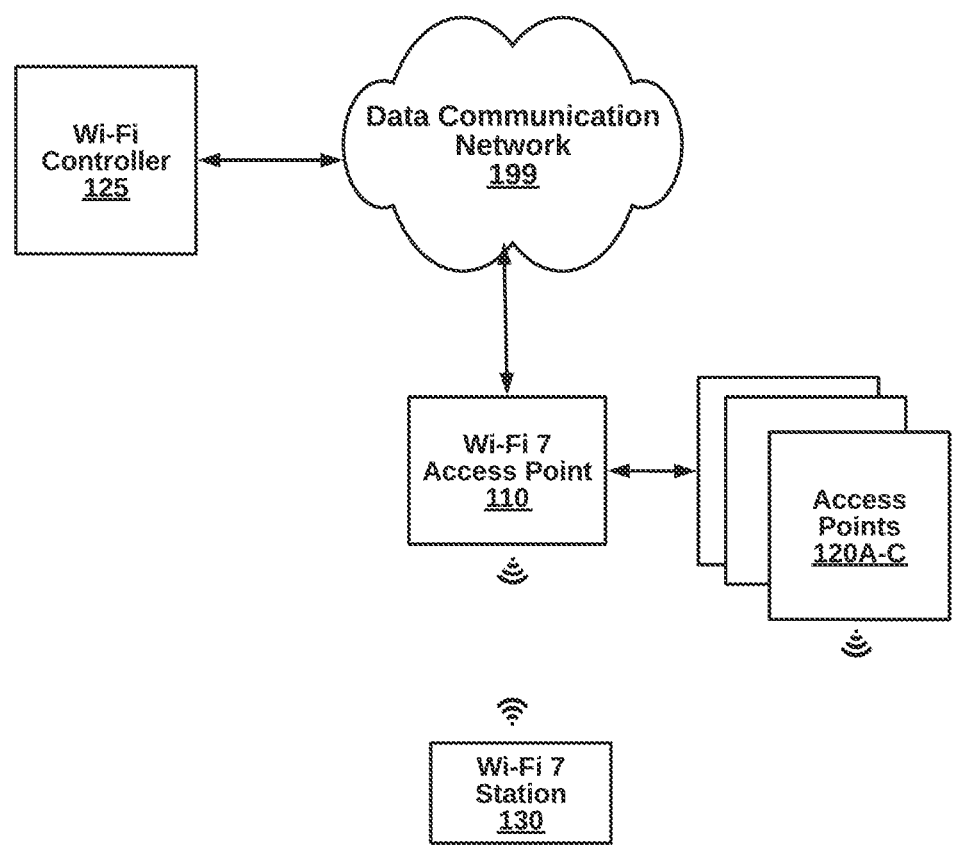
FIG. 1 is a high-level block diagram illustrating a network system for dynamic data frame puncturing, according to one embodiment.
Figure 2:
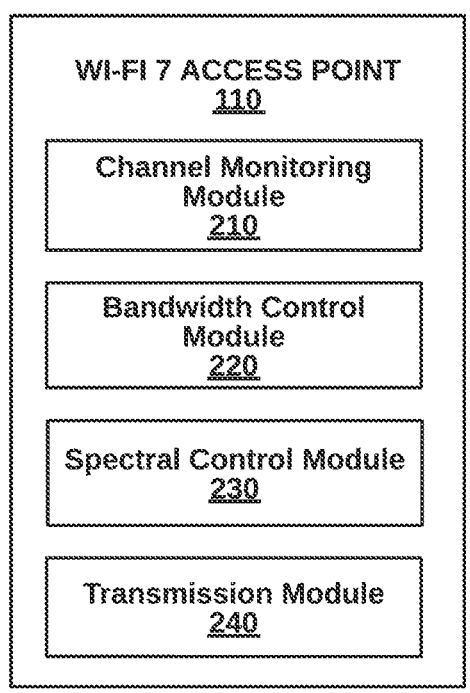
FIG. 2 is a more detailed block diagram illustrating a Wi-Fi 7 access point of the system of FIG. 1, according to one embodiment.

FIG. 1 is a high-level block diagram illustrating a network system 100 for dynamic data frame puncturing to manage Wi-Fi 7 channel bandwidth, according to one embodiment. The network system 100 includes a Wi-Fi 7 access point 110 among a group of access points 120A-C serving Wi-Fi 7 station 130. Other embodiments of the system 100 can include additional components that are not shown in FIG. 1, such as controllers, network gateways, additional access points, and additional wired or wireless stations.

The Wi-Fi 7 access point 110 can be coupled to a data communication network 199 such as a private network connected to the Internet. The Wi-Fi 7 access point 110 can be connected to the data communication system via hard wire (e.g. Ethernet) or wireless networking. The data communication network 199 can be composed of any data communication network such as an SDWAN, an SDN (Software Defined Network), WAN, a LAN, the Internet, WLAN, a cellular network (e.g., 3G, 4G, 5G or 6G), or a hybrid of different types of networks. Various data protocols can dictate format for the data packets. For example, Wi-Fi data packets can be formatted according to IEEE 802.11, IEEE 802.11r, 802.11be, Wi-Fi 6, Wi-Fi 6E, Wi-Fi 7 and the like. Components can use IPv4 or IPV6 address spaces.

The Wi-Fi 7 access point 110 changes modes of bandwidth policy responsive to high usage. This can be because multiple Wi-Fi 7 access points are sharing a common channel. In ordinary operations, Wi-Fi 7 access point 110 serves as an on ramp for wireless stations to reach a wired backbone of the data communication network 199. Therefore, wireless packets are formatted and transmitted for traveling downstream to stations and are received when traveling upstream from stations. Table 1 below shows an example of how data frames are formatted when usage conditions are below threshold. Table 2 shows an example of how data frames are formatted when conditions are above threshold. The bandwidth of channel transmissions has changed, between Tables 1 and 2, to preserve bandwidth for management frames.

| Idle condition before the threshold usage. | | | | | |
|---|---|---|---|---|---|
| 36/80 Mhz | | | | | |
| Channel | 36 | 40 | 44 | 48 | Channel numbers from 36 to 48 |
| Channel width | 20 | 20 | 20 | 20 | Total 80 mhz |
| Management frames | Uses | No | No | No | All model of AP uses primary 20 Mhz (36/20) for management frames |
| Data Frames | Uses Entire 80 Mhz for data frames | | | | Wi-Fi 7 Access point transmits Data Frames on entire 80 Mhz channel width |

| Below Table-Once threshold value reached. | | | | | |
|---|---|---|---|---|---|
| 36/80 Mhz | | | | | |
| Channel | 36 | 40 | 44 | 48 | Channel numbers from 36 to 48 |
| Channel width | 20 | 20 | 20 | 20 | Total 80 mhz |
| Management frames | Uses | No | No | No | All model of AP uses primary 20 Mhz (36/20) for management frames |
| Data frames | primary 20 Mhz is punctured for Data frames | AP uses remaining 60 Mhz for Data frames | | | Wi-Fi 7 Access point transmits Data Frames on remaining 60 Mhz channel width |

In ordinary operations, the Wi-Fi 7 access point 110 broadcasts beacons periodically to advertise connection services. A station within range of the RF signal becomes aware of access points to choose from for connections services. Access points offer basic service set identifiers (BSSIDs) or virtual access points (VAPs), in some cases over a common channel (e.g., 36/80 MHz). During certain time periods, traffic conditions and usage increase, such as between 9 and 11 am at a business office, also leading to an increase in beacons and probe responses. Dynamic network conditions described herein help ameliorate the effects of high usage. The other access points 120A-C may also be Wi-Fi 6 or Wi-Fi 7 compatible.

The Wi-Fi 7 station 130 is capable of Wi-Fi 7 operations with the Wi-Fi 7 access point 110. The device can be a laptop, a smart telephone, a PC, a smart appliance, or any appropriate processor-driven device. For example, in an office environment, workers use office computing equipment and bring personal devices from home, and connect these devices for Internet service. The Wi-Fi 7 station 130 can execute network applications for users, that require EHT data transfers. Additionally, the Wi-Fi 7 station 130 can be backwards compatible to earlier Wi-Fi standards.

A Wi-Fi controller 125, in some embodiments, also participates in the dynamic puncturing. In general operations, the Wi-Fi controller 125 manages Wi-Fi operations of the access points 120, 130A-C. In doing so, network statistics collected can be leveraged for determining when and to what degree dynamic puncturing is invoked. For example, a threshold for channel bandwidth or for channel spectral modes can be based in part on network wide statistics maintained by the Wi-Fi controller 125. Additionally, the Wi-Fi controller 125, having a network-wide view through the access points, can track individual stations while roaming to different access points.

FIG. 2 is a more detailed block diagram illustrating the Wi-Fi 7 access point 110 of FIG. 1, according to an embodiment. The Wi-Fi access point 110 includes a channel monitoring module 210, a bandwidth control module 220, a spectral control module 230, and a transmission module 240. Components can be implemented in software and/or software. Many other variations of components are possible.

The channel monitoring module 210 can monitor usage of the primary channel transmission bandwidth. To do so, a threshold usage of the primary channel transmission bandwidth is detected as exceeding a predetermined value. Usage can be directly measured or picked up from other operating system processes. The threshold value can be set by a network administrator, set at default, or be programmatically adjusted based on network conditions. In an embodiment, a first threshold triggers channel bandwidth limitations while a second threshold triggers channel spectral limitations.

The bandwidth control module 220, in one mode, uses an entire channel transmission bandwidth, including a primary channel (e.g., 36) transmission bandwidth (e.g., 20 MHz) and a remaining channel transmission bandwidth (e.g., 60 MHz), to transmit and receive management frames and data frames to and from multiple Wi-Fi 7 clients along with the plurality of access point having multiple BSSIDs. In another mode, the bandwidth control module 210 adjusts channel bandwidth usage.

The bandwidth control module 220, responsive to the first threshold usage being surpassed, a puncturing pattern is activated to transmit data frames over the remaining channel transmission bandwidth (e.g., 60 MHZ) while continuing to transmit management frames over the primary channel transmission bandwidth (as shown above in Tables 1 and 2). For instance, a channel utilization threshold can be set at 60% or also at some raw quantitative value or combination of values, such as number of connected client or throughput. In more detail, a subchannel bitmap is disabled in an EHT Operation Information subfield of EHT Operation Element. FIG. 3 shows a frame format of an EHT Operation Element 300. The disabled subchannel bitmap 310 is detailed to show an example of puncturing patterns over an 80 MHz channel bandwidth.

Responsive to a second threshold being surpassed, the spectral control module 230 activates to allocate spectral density among network components. The Wi-Fi 6 technology permits orthogonal frequency-division multiple access (OFDMA) and assignment of RU tones. In an embodiment, a combination of RU sizes are determined to best fit one or more data packets. For example, smaller size RU tones can be assigned to 300 bytes and larger size RU tones assigned to 300 bytes or larger. This permits shared access for transmissions from access point to client.

The transmission module 240 then transmits data packets, for example, using bandwidth allocations and RU allocations for multiple wireless clients over the remaining channel transmission bandwidth. One hardware embodiment includes Wi-Fi transceivers that signal across a wireless channel. Hardware adjustments are made to turn in specific bandwidth and spectrum.

II. Methods for Dynamic Data Frame Puncturing (FIGS. 4-5)

Figure 4:
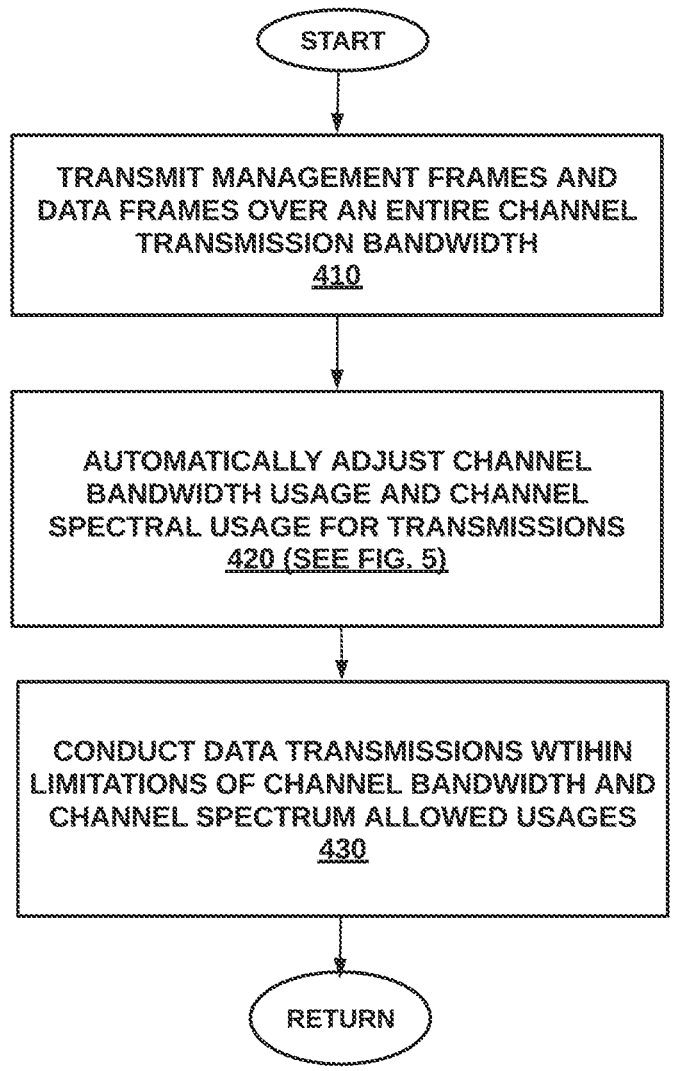
FIG. 4 is a high-level flow chart for dynamically adjusting channel bandwidth and spectral usage according to data traffic levels, according to an embodiment.

FIG. 4 is a high-level flow diagram illustrating a method 400 for dynamically adjusting channel bandwidth and spectral usage according to data traffic levels. The method 400 can be implemented by, for example, system 100 of FIG. 1. Note that there can be more steps or less steps than shown, and steps can be performed in different orders.

At step 410, transmitting management frames and data frames over an entire channel transmission bandwidth to transmit and receive management frames and data frames to and from multiple Wi-Fi 7 clients along with the plurality of access point having multiple BSSIDs. At step 420, channel bandwidth usage and channel spectral usage are automatically adjusted for transmissions, as described below with reference to FIG. 5. At step 430, data transmissions are conducted within limitations of channel bandwidth and channel spectrum. In some embodiments, the process continues until the Wi-Fi 7 access point is removed from the grid, due to power down, reboot, or errors.

Figure 5:
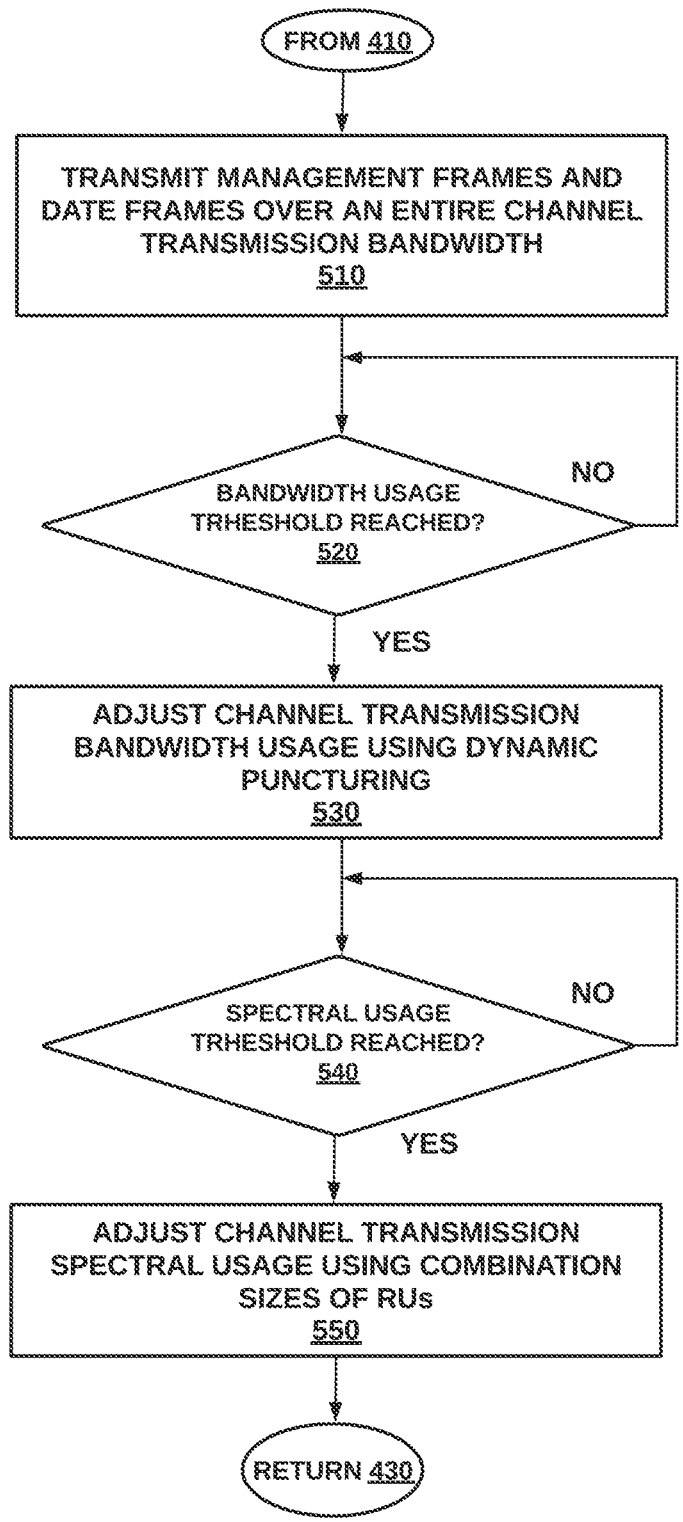
FIG. 5 is a high-level flow chart for using dynamic puncturing of data frames to manage Wi-Fi 7 channel transmission bandwidth, according to one embodiment.

A more detailed example of step 420 for adjusting transmission bandwidth usage using dynamic puncturing, is shown in FIG. 5, according to one embodiment. At step 510, usage of the primary channel transmission bandwidth is monitored and tracked. At step 520, a threshold usage exceeding the primary channel transmission bandwidth is detected. Responsive to reaching the threshold usage detection, at step 530, a puncturing pattern is activated to transmit data frames over the remaining channel transmission bandwidth while continuing to transmit management frames over the primary channel transmission bandwidth. Responsive to reaching a second threshold usage detecting, at step 540, then at step 550, data packets are transmitted using RU allocations for multiple wireless clients over the remaining channel transmission bandwidth.

III. Computing Device for Dynamic Data Frame Puncturing (FIG. 6)

Figure 6:
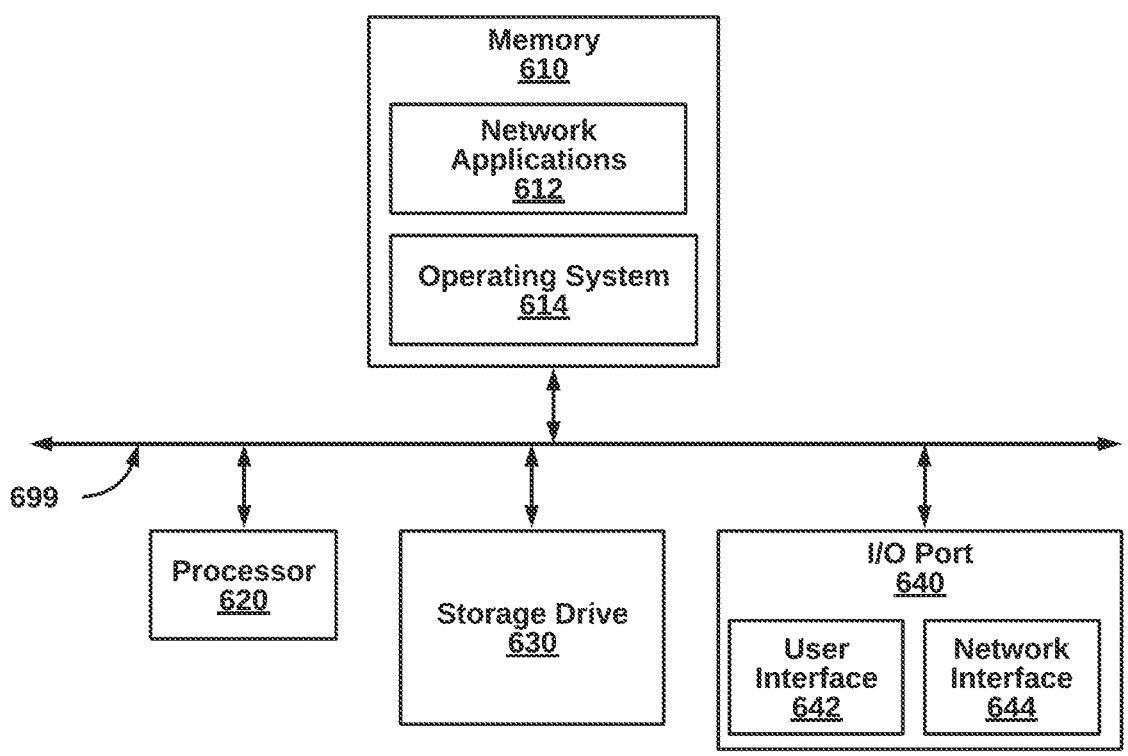
FIG. 6 is a block diagram illustrating an example computing device implementing the dynamic frame puncturing of FIG. 1, according to one embodiment.

FIG. 6 is a block diagram illustrating a computing device 600 implementing the packet processor 100 of FIG. 1, according to one embodiment. The computing device 600 is a non-limiting example device for implementing each of the components of the system 100, including the Wi-Fi 7 access point 110, access points 120A-C and Wi-Fi 7 station 130. Additionally, the computing device 600 is merely an example implementation itself, since the system 100 can also be fully or partially implemented with laptop computers, tablet computers, smart cell phones, Internet access applications, and the like.

The computing device 600, of the present embodiment, includes a memory 610, a processor 620, a hard drive 630, and an I/O port 640. Each of the components is coupled for electronic communication via a bus 650. Communication can be digital and/or analog, and use any suitable protocol.

The memory 610 further comprises network access applications 612 and an operating system 614. Network access applications can include 612 a web browser, a mobile access application, an access application that uses networking, a remote access application executing locally, a network protocol access application, a network management access application, a network routing access applications, or the like.

The operating system 614 can be one of the Microsoft Windows® family of operating systems (e.g., Windows 98, 98, Me, Windows NT, Windows 2000, Windows XP, Windows XP x84 Edition, Windows Vista, Windows CE, Windows Mobile, OR Windows 7-11), Linux, HP-UX, UNIX, Sun OS, Solaris, Mac OS X, Alpha OS, AIX, IRIX32, or IRIX84. Other operating systems may be used. Microsoft Windows is a trademark of Microsoft Corporation.

The processor 620 can be a network processor (e.g., optimized for IEEE 802.11), a general-purpose processor, an access application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the hard drive 630.

The storage device 630 can be any non-volatile type of storage such as a magnetic disc, EEPROM, Flash, or the like. The storage device 630 stores code and data for access applications.

The I/O port 640 further comprises a user interface 642 and a network interface 644. The user interface 642 can output to a display device and receive input from, for example, a keyboard. The network interface 644 connects to a medium such as Ethernet or Wi-Fi for data input and output. In one embodiment, the network interface 644 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, Javascript, PHP, Python, Perl, Ruby, AJAX, and Adobe® Flash®. The computer software product may be an independent access point with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VOIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTI Wi-Fi family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical access applications. This description will enable others skilled in the art to best utilize and practice the invention in various embodiments and with various modifications as are suited to a particular use. The scope of the invention is defined by the following claims.

I claim:

1. A method in a Wi-Fi 7 access point, deployed within a plurality of access points on a data communication network and the Wi-Fi 7 access point having multiple basic service set identifiers (BSSIDs) on a common channel, for using dynamic puncturing of data frames to manage Wi-Fi 7 channel transmission bandwidths, the method comprising:
    monitoring a usage of a primary channel transmission bandwidth within an entire channel transmission bandwidth;
    occupying the entire channel transmission bandwidth for transmissions, including the primary channel transmission bandwidth and the remaining channel transmission bandwidth, to transmit and receive management frames and the data frames to and from multiple Wi-Fi 7 client devices along with the plurality of access points having the multiple BSSIDs;
    responsive to detecting a first usage of the primary channel transmission bandwidth exceeding a first predetermined value, activating a puncturing pattern to transmit the data frames over the remaining channel transmission bandwidth while continuing to transmit the management frames over the primary channel transmission bandwidth;
    responsive to detecting a second usage of the primary channel transmission bandwidth exceeding a second predetermined value, separating the data frames using a combination of sizes of resource unit (RU) allocations for the multiple Wi-Fi 7 client devices over the remaining channel transmission bandwidth;
    transmitting the data frames according to bandwidth limitations and spectral limitations; and
    responsive to detecting the first usage of the primary channel transmission bandwidth falling back below the first predetermined value, deactivating the puncturing pattern to transmit the data frames over the remaining channel transmission bandwidth.

2. The method of claim 1, wherein each of the data frames comprises a header.

3. The method of claim 1, wherein a primary channel corresponding to the primary channel transmission bandwidth comprises a channel number of 36.

4. The method of claim 1, wherein the primary channel transmission bandwidth comprises 20 Mhz.

5. The method of claim 1, wherein the remaining channel transmission bandwidth comprises 60 Mhz.

6. The method of claim 1, wherein activating the puncturing pattern comprises disabling a Subchannel bitmap in an EHT (Extremely High Throughput) Operation subfield of an EHT Operation Element.

7. A non-transitory computer-readable medium in a Wi-Fi 7 access point deployed within a plurality of access points on a data communication network and the Wi-Fi 7 access point having multiple basic service set identifiers (BSSIDs) on a common channel, for using dynamic puncturing of data frames to manage Wi-Fi 7 channel transmission bandwidths, the method comprising:
    monitoring a usage of a primary channel transmission bandwidth within an entire channel transmission bandwidth;
    occupying the entire channel transmission bandwidth for transmissions, including the primary channel transmission bandwidth and the remaining channel transmission bandwidth, to transmit and receive management frames and the data frames to and from multiple Wi-Fi 7 client devices along with the plurality of access points having the multiple BSSIDs;
    responsive to detecting a first usage of the primary channel transmission bandwidth exceeding a first predetermined value, activating a puncturing pattern to transmit the data frames over the remaining channel transmission bandwidth while continuing to transmit the management frames over the primary channel transmission bandwidth;

responsive to detecting a second usage of the primary channel transmission bandwidth exceeding a second predetermined value, separating the data frames using a combination of sizes of resource unit (RU) allocations for the multiple Wi-Fi 7 client devices over the remaining channel transmission bandwidth;

transmitting the data frames according to bandwidth limitations and spectral limitations; and responsive to detecting the first usage of the primary channel transmission bandwidth falling back below the first predetermined value, deactivating the puncturing pattern to transmit the data frames over the remaining channel transmission bandwidth.

8. A Wi-Fi 7 access point deployed within a plurality of access points on a data communication network and the Wi-Fi 7 access point having multiple basic service set identifiers (BSSIDs) BSSIDs on a common channel, for using dynamic puncturing of data frames to manage Wi-Fi 7 channel transmission bandwidths, the network device comprising:

a processor;

a network communication interface module, communicatively coupled to the processor and to the data communication network; and a memory, communicatively coupled to the processor and storing:

a channel monitoring module that, when executed by the processor, causes the network device to monitor a usage of a primary channel transmission bandwidth within an entire channel transmission bandwidth;

a bandwidth control module that, when executed by the processor, causes the network device to occupy the entire channel transmission bandwidth for transmissions, including the primary channel transmission bandwidth and the remaining channel transmission bandwidth, to transmit and receive management frames and the data frames to and from multiple Wi-Fi 7 client devices along with the plurality of access points having the multiple BSSIDs, wherein responsive to the channel monitoring module that, when executed by the processor, causes the network device to detect a first usage of the primary channel transmission bandwidth exceeding a first predetermined value, the bandwidth control module that, when executed by the processor, causes the network device to activate a puncturing pattern to transmit the data frames over the remaining channel transmission bandwidth while continue to transmit the management frames over the primary channel transmission bandwidth;

responsive to the channel monitoring module that, when executed by the processor, causes the network device to detect a second usage of the primary channel transmission bandwidth exceeding a second predetermined value, a spectral control module that, when executed by the processor, causes the network device to separate the data frames using a combination of sizes of resource unit (RU) allocations for the multiple Wi-Fi 7 client devices over the remaining channel transmission bandwidth;

a transmission module that, when executed by the processor, causes the network device to transmit the data frames according to bandwidth limitations and spectral limitations; and responsive to the channel monitoring module that, when executed by the processor, causes the network device to detect the first usage of the primary channel transmission bandwidth falling back below the first predetermined value, the bandwidth control module that, when executed by the processor, causes the network device to deactivate the puncturing pattern to transmit the data frames over the remaining channel transmission bandwidth.

* * * * *